United States Patent [19]
Lin et al.

[11] Patent Number: 6,137,437
[45] Date of Patent: Oct. 24, 2000

[54] SPACEBORNE SCATTEROMETER

[75] Inventors: Chung-Chi Lin, Rijnsburg, Netherlands; John Julian William Wilson, London, United Kingdom; Fabrizio Impagnatiello, Rome, Italy; Peter Park, Beaconsfield, Canada

[73] Assignee: Agence Spatiale Europeenne, Paris, France

[21] Appl. No.: 09/275,020

[22] Filed: Mar. 24, 1999

[51] Int. Cl.[7] .................................................. G01S 13/60
[52] U.S. Cl. ......................... 342/104; 342/25; 342/115; 342/117; 342/157; 342/158; 342/354
[58] Field of Search ............................ 342/25, 104, 115, 342/117, 158, 157, 352, 354, 368

[56] References Cited

U.S. PATENT DOCUMENTS

| | | | |
|---|---|---|---|
| 4,633,255 | 12/1986 | Trizna | 342/192 |
| 4,724,439 | 2/1988 | Wiley et al. | 342/351 |
| 4,748,448 | 5/1988 | Thompson | 342/26 |
| 4,922,254 | 5/1990 | Schuessler et al. | 342/25 |
| 4,990,925 | 2/1991 | Edelsohn et al. | 342/424 |
| 5,053,781 | 10/1991 | Milman | 342/351 |
| 5,264,852 | 11/1993 | Marquet | 342/26 |
| 5,526,008 | 6/1996 | Meserole et al. | 343/761 |
| 6,011,505 | 1/2000 | Poehler et al. | 342/25 |

OTHER PUBLICATIONS

J. Kerkmann, et al., "Perspectives for the Advanced Scatterometer (ASCAT) on Metop", ESA SP–424, Nov. 1998, pp. 13–19.

Harald Schyberg, et al., "Optimal Ambiguity Removal for Scatterometer Winds", ESA SP–424, Nov. 1998, pp. 191–196.

Primary Examiner—John B. Sotomayor
Attorney, Agent, or Firm—Oblon, Spivak, McClelland, Maier & Neustadt, P.C.

[57] ABSTRACT

A scatterometer orbiting around the earth globe comprises a single fanbeam radar antenna which is rotated around a vertical axis, at a slow rotation rate. The antenna foot-print sweeps a circular disc. The slow conical sweep combined with the motion of the satellite on which the scatterometer is mounted results in highly overlapping successive sweeps such that an image pixel is revisited many times during an overpass. The pixels in the radial direction are resolved by range-gating the radar echo. The radar operates in the C-band. The scatterometer is intended, in particular, to determine wind speed and direction over the ocean.

15 Claims, 6 Drawing Sheets

FIG.6

SPACEBORNE SCATTEROMETER

BACKGROUND OF THE INVENTION

1. Field of the Invention

The invention concerns a spaceborne scatterometer.

The invention concerns more specifically a wind-scatterometer.

2. Discussing of the Background

The primary mission of a spaceborne scatterometer is to determine wind speed and direction over the ocean. This is achieved by performing a set of radar cross-section measurements (referenced as $\sigma^0$) at different azimuth view-angles over a resolution cell. Then, the relationship which relates the wind speed and direction to the radar cross-section, the so-called $\sigma^0$ model, is inverted to extract the wind information. A minimum number of independent measurements per pixel (known as resolution cell) of three is required for an unambiguous wind extraction (three degrees of freedom).

This is realized by the current generation of scatterometers, such as:

ERS-½ AMI-Wind (which is described for example in the following publication: "The DataBook of ERS-1", ESA Publication ESA BR-75, April 1991); or NSCAT (NASA Scatterometer, on-board ADEOS-1 satellites series, description of which can be obtained, for example, from the following WEB page (February 1998):

http://www.eorc.nasda.go.jp/ADEOS/Project/Nscat.html;

and a next generation of scatterometers, such as ASCAT, on-board METOP satellites series, as described in J. Kerkmann and D. Klaes, "Perspective for the Advanced Scatterometer (ASCAT) on METOP, " Proc. ESTEC Workshop on Emerging Scatterometer Applications, ESA Publication ESA SP-424, November 1998, pages 13–19.

by use of three independent antennas (i.e. three independent beams) per imaged swath (for example 45°, 90 ° and 135° azimuth orientations for AMI-Wind and ASCAT).

Another scatterometer, the SEASAT scatterometer (described for example in the article by D. Offiler, "A Comparison of SEASAT Scatterometer-Derived Winds with JASIN Surface Winds," Int. J. Remote Sensing, Vol. 5, 1984, PP. 365–378) had two beams per swath only, resulting in ambiguous wind direction which had to be removed using additional information from a weather model.

On the other hand, a next generation of scatterometers, such as SeaWinds (which is described for example in the article by M. W. Spencer et al.: "Tradeoffs in the Design of a Spaceborne Scanning Pencil Beam Scatterometer: Application to SeaWinds," IEEE Trans. Geosc. & Remote Sensing, Vol. 35, 1997, pp. 115–126) uses a conically scanning spot (pencil-)beam antenna to obtain two to four independent views per pixel depending on the swath position. The central part (1400 km) of the swath is characterized by four views whereas only two views are provided within the 200 km wide-edge-strips, resulting in a 1800 km total swath. This limitation of two views only within said edge-strips of the swath is due to the use of two spot beams for illuminating the ocean surface. The resulting ambiguity in wind direction must be dealt with by special ambiguity removal techniques.

Accordingly, there are two main categories of scatterometers: fixed, multiple beam scatterometers, and mechanically rotated spot (pencil-) beam antenna around a vertical axis, respectively.

Technical characteristics and drawbacks of said two categories of scatterometers will be now described in a more detailed manner.

A fixed, multiple beam scatterometer, such as ERS-½ AMI-Wind, NSCAT, ASCAT, and SEASAT scatterometers, uses deployable fan-beam antennas to image a swath parallel to the sub-satellite track. Once deployed, no mechanical control is required for the antennas, which simplifies the spacecraft attitude control. However, a number of disadvantages are associated with the concept:

1/ Each of the antennas requires a free field-of-view, making their accommodation difficult on the spacecraft (antenna length is typically 3.5 to 4 m at C-band).

2/ The deployment of the antennas is a critical operation.

3/ A switch matrix is required in the radar front-end in order to commute between the different antennas. This introduces additional losses and a critical RF-path (single point failure).

4/ The side-looking radar working principle does not allow the area under the satellite to be imaged. A large gap around the nadir is unavoidable as a consequence. This makes the global Earth coverage more difficult.

For a non-ambiguous wind retrieval, a minimum of three azimuth look-angles per pixel are required. ERS-½ AMI-Wind uses three antennas for imaging a 500-km swath on the right-hand-side of the satellite. Both the NSCAT and ASCAT have a double imaged swath, requiring six antennas to be mounted. The SEASAT scatterometers also had a double swath, but were limited to two azimuth view-angles per imaged swath. Consequently, a directional ambiguity remained after applying the wind retrieval algorithm, which had to be removed using empirical methods.

The NASA SeaWinds scatterometer uses a mechanically rotated antenna around the vertical axis, which produces two spot (pencil-)beams sweeping in a circular motion (reflector antenna). The requirement to produce a continuous coverage imposes a minimum rotation speed of around 18-rpm (3.3 s rotation period). The problem of the swath gap around the nadir is effectively solved for this configuration at a price of the following disadvantages:

1/ The high rotation speed of the antenna (1-meter-diameter reflector) poses mechanical reliability and spacecraft stability (high momentum) problems.

2/ The concept would be difficult to apply at C-band as the antenna dimension would have to be multiplied by a factor of 2.5 (SeaWinds operates at Ku-band).

3/ Only two azimuth view-angles per pixel are provided beyond 700 km (radius of the inner spot beam) on both sides of the sub-satellite track, which is a very serious drawback for wind retrieval (similar to SEASAT).

4/ The speed of rotation is closely related to the spatial resolution and the number of spot beams. An improvement of the spatial resolution would require an increasingly complex instrument (larger antenna, higher rotation speed, more spot beams, i.e. more radar channels).

On the other hand, the desirable features of a wind scatterometer are:

a rapid global coverage of the Earth (within one to two days) which requires a wide measurement swath (typically equal or greater than 1500 km);

an adequate spatial resolution to resolve ocean surface wind under various meteorological conditions (typically 25 to 50 km); and an accurate wind retrieval which requires a high radiometric accuracy and multiple azimuth view-angle (typically $\geq 3$ independent) measurements.

SUMMARY OF THE INVENTION

Accordingly, one goal of the invention is a scatterometer which fulfills said features.

Another goal is a scatterometer, which avoids the above mentioned prior art drawbacks and provides larger number of measurements per pixel, at different azimuth view-angles.

A further goal is to combine the advantages of both a fixed, multiple fanbeam scatterometer and a conically scanned pencil-beam scatterometer.

To achieve these goals, a specific combination of a range-gated fanbeam radar and a rotating antenna arrangement is employed. The working principle of said arrangement enables a wide swath coverage, typically exceeding 1500 km and multiple azimuth views (up to ten per overpass) with a spatial resolution of 15 km. The proposed instrument is simple, presenting a low technology risk, robust and easy to accommodate on a satellite.

Though a scatterometer according to the invention is mainly intended to determine wind speed and direction over the ocean, such a scatterometer may find applications in other fields.

For example, scatterometer data have found recently applications in monitoring land surfaces and sea ice. As a result of these expanding areas of applications, users are requesting a better spatial resolution of the order of 10 km for future missions. A scatterometer according to the invention allows such a better resolution.

Accordingly a main object of the invention is a scatterometer mounted on-board a spacecraft orbiting around the earth globe at a determined speed, said scatterometer being intended to image points on a strip of the earth surface, in order to measure determined physical parameters, said scatterometer comprising a single antenna, rotated around a vertical axis with respect to a sub-spacecraft track on said earth surface, at a determined rotation rate, and comprising transmitter-receiver means, coupled to said antenna, in order to generate radar signals transmitted as a fanbeam conically scanning said earth surface, the footprint of which sweeps a circular disc, and to receive radar echo signals from transmitted radar signals illuminating said earth surface and processing said radar echo signals in order to derive said physical parameters; said determined rotation rate and the ground-speed component along said sub-spacecraft track of said determined speed along said orbit being so combined that it results in highly overlapping successive sweeps, so that a point within said strip is intercepted by said foot-print and acquired at a number of occasions during an overpass, preferably more than twice.

BRIEF DESCRIPTION OF THE DRAWINGS

The invention will be more clearly understood and other features and advantages will emerge from reading the following description, given with reference to the appended drawings wherein.

DETAILED DESCRIPTION OF THE PREFERRED EMBODIMENTS

As already recalled, though the invention is not limited to a scatterometer intended to determine wind speed and direction over the ocean, the following detailed description will address such an application (which constitutes the preferred application), unless otherwise stated.

Figure 1:
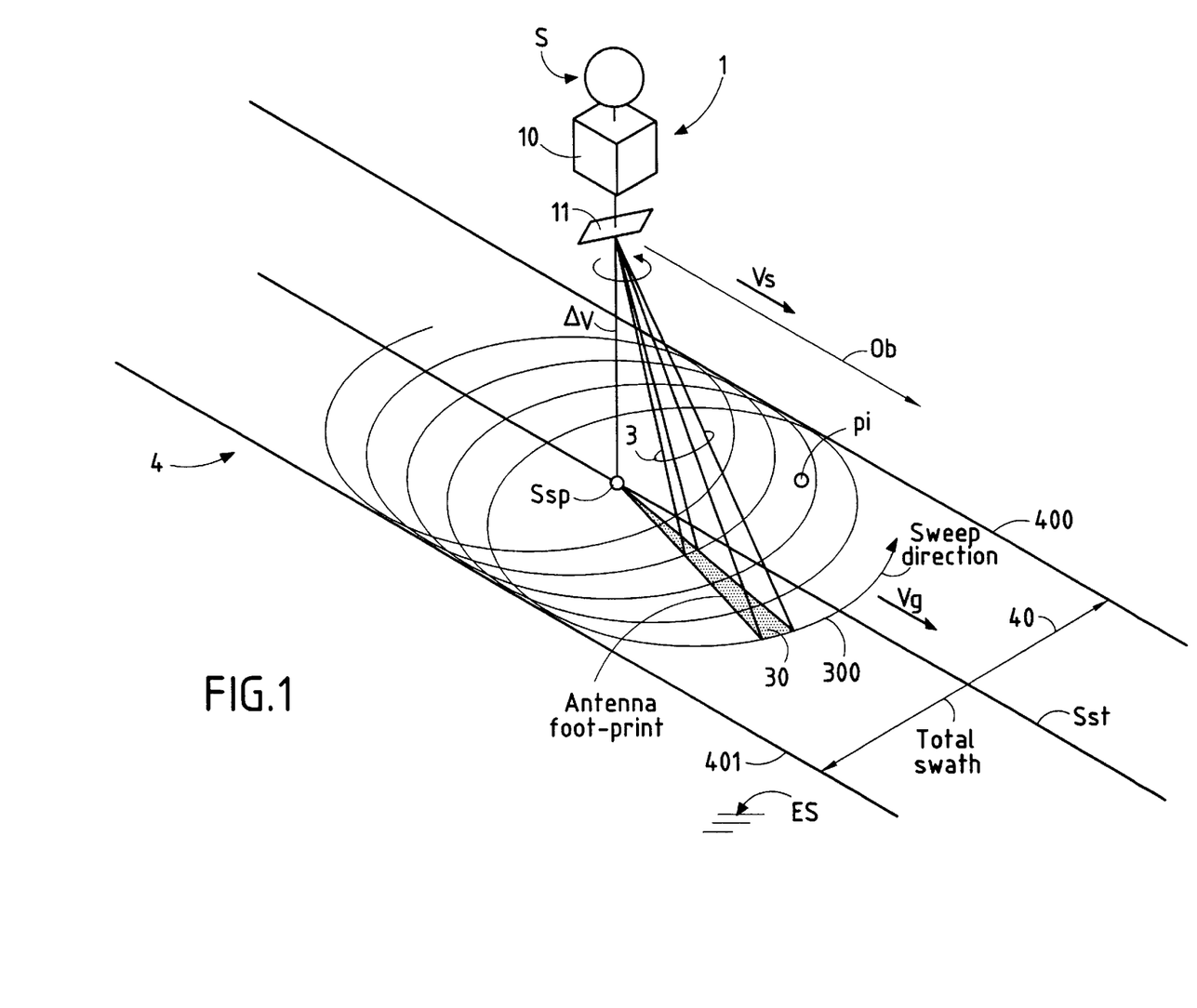
FIG. 1 schematically represents an example of an architecture of a scatterometer according to the invention.

The working principle of a scatterometer 1 according to the invention is illustrated in FIG. 1.

The scatterometer 1 is mounted on-board a spacecraft S. It comprises a radar unit 10 associated with an antenna 11. The antenna 11 is rotating slowly around a vertical axis $\Delta V$ (with respect to the earth surface ES), i.e. the nadir. The vertical axis $\Delta V$ crosses the earth surface ES at point SSp, which follows a line representing the sub-satellite track SSt. Spacecraft S is moving along a given circular orbit Ob, parallel to said sub-satellite track SSt. To a spacecraft motion Vs corresponds a ground motion referenced Vg.

According to one aspect of the invention, antenna 10 generates a narrow fanbeam 3, which also rotates slowly around the vertical axis $\Delta V$, such that its footprint 30 sweeps a fat doughnut-shape on the earth surface ES. Combined with the spacecraft motion VS, which is associated with a ground-speed Vg, large overlaps are produced by the successive sweeps 300, as shown in FIG. 1. The successive sweeps 300 determine the width of the total swath 40. Sub-satellite track SSt forms a median line for the total swath 40.

Any pixel pi within the total swath 40, depending on its across-track position, is intercepted by the antenna footprint 30 at a number of occasions, first in the forward direction and later in the backward direction.

The radar 10 and its associated antenna 11 operate in a pulsed mode, so that each point of the echo profile (which corresponds to a time position) can be attributed to a unique pixel position pi within the antenna foot-print 30 along the radial direction (i.e. range-gated). The speckle effects are greatly reduced by averaging a large number of range pixels at first, using a range-look summation process, followed by a summation of multiple echoes.

Figure 2:
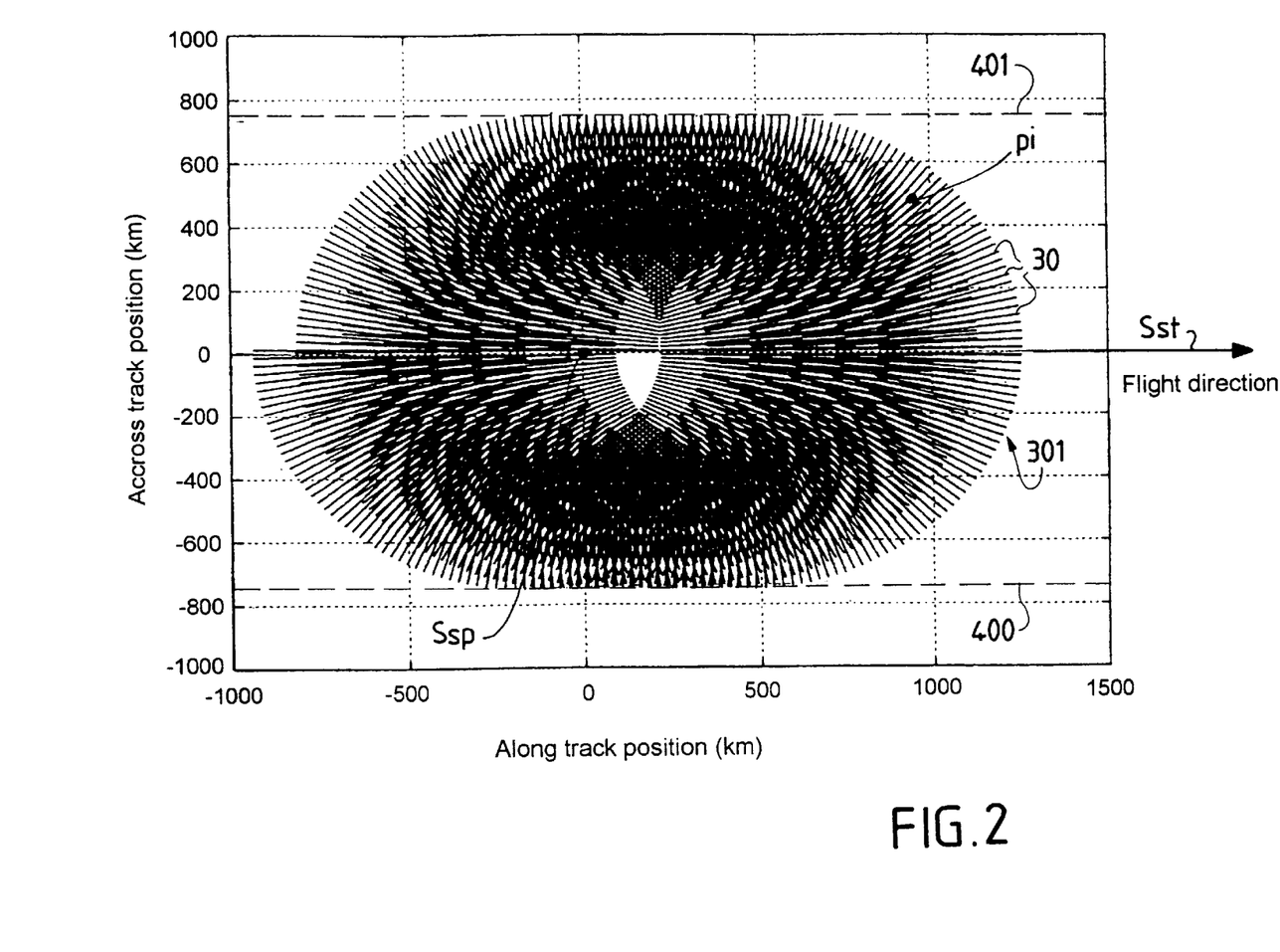
FIG. 2 shows a foot-print of the antenna of the scatterometer according to FIG. 1, over a flight distance of 675 km.

As a pulsed mode is used, the figure representing the successive sweeps 300 is not a continuous figure. As shown in FIG. 2, FIG. 301 comprises a plurality of separate narrow footprints 30, with orientation angles with respect to Subsatellite track SSt continuously changing (range direction), in synchronism with the rotation speed of the antenna 11.

The pixels in the radial direction are resolved by range-gating the echo.

It must be mentioned that the wind extractions can not be done directly near the sub-satellite track SSt, nor can they at the edges of the total swath 40, as the set of azimuth view-angles in those regions are non-optimum for this purpose.

Figure 3:
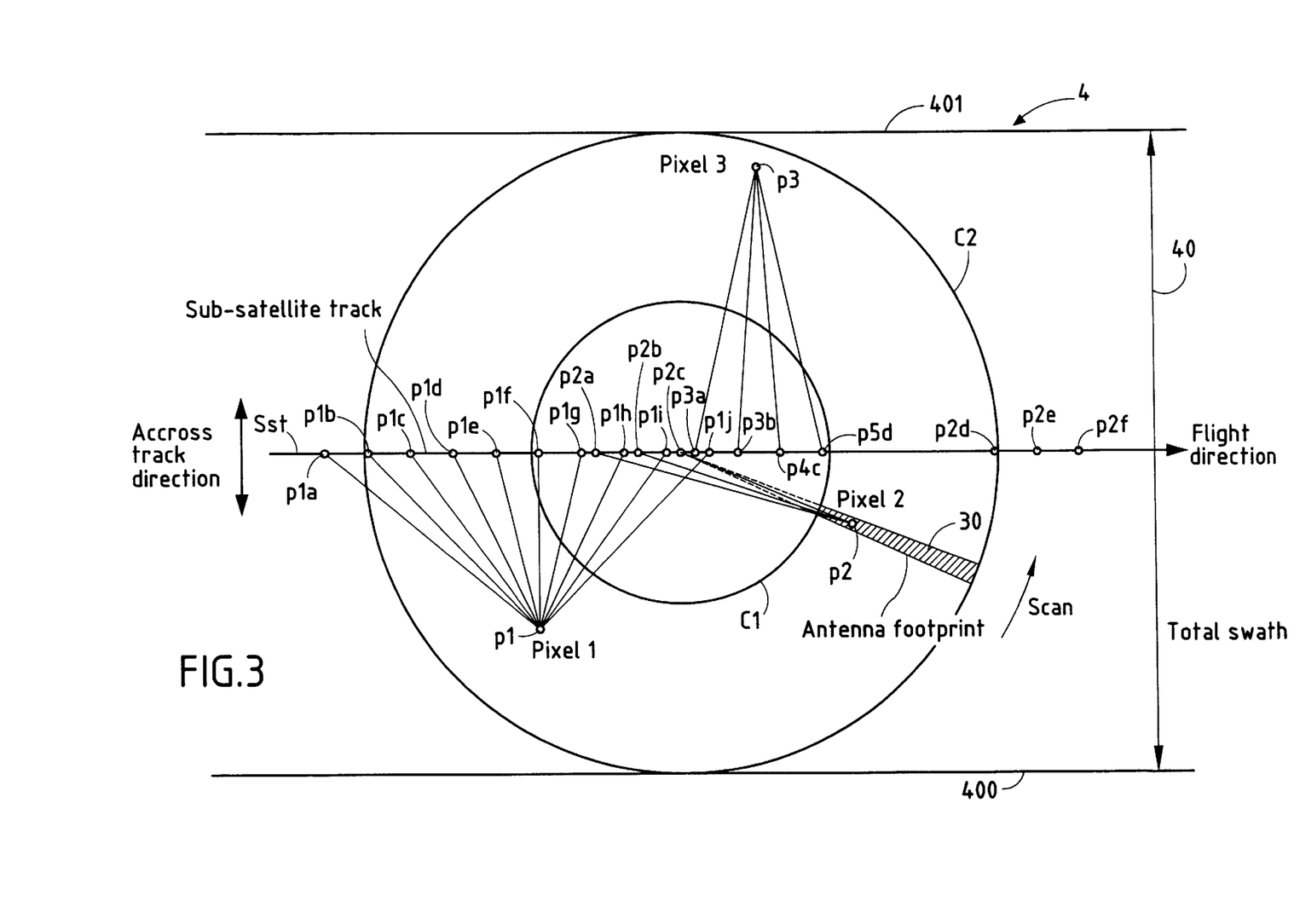
FIG. 3 represents examples of pixel acquisition geometry, i.e. a set of measurements for given pixels.

As shown also in FIG. 3, the measurement area corresponds to the portion of the swath where the azimuth view-angles are evenly distributed. This is not the case around the sub-satellite track SSt and in the vicinity of the swath edges 400 and 401 where the view-angles are concentrated around the forward and backward direction with respect of the flight direction as illustrated by the pixel position p2, and around the orthogonal direction to the sub-satellite track SSt as illustrated by the pixel position p3, respectively. The situation is similar to the seawinds scatterometer and direct inversions of the $\sigma^0$ model within those areas generally result in a number of ambiguous wind directions. Those can be resolved with so-called ambiguity removal techniques (e.g. see H. Schyberg and L. A. Breivik, "Optimal Ambiguity Removal for Scatterometer Winds", Proc. ESTEC Workshop on Emerging Scatterometer Applications, ESA Publication ESA SP-424, November 1998, pages 191–196) where the $\sigma^0$ model inversion is coupled to a numerical weather model assimilation in a feedback scheme so as to maximise the probability of successful wind extraction. Therefore even with an incomplete set of radar cross-section measurements, the wind extraction would be possible in those regions. In contrast, the situation is much worse for NSCAT and ASCAT where no measurement is acquired around the sub-satellite area (central area).

For the purpose of better illustrating the invention, two baselines are summarized in Table 1, attached to the present disclosure. They are related to two different orbits: altitudes 725 km and 1025 km, respectively.

Rotation periods of 18 s (3.3 rpm) and 25 s (2.4 rpm), respectively, have been selected for two altitude options of the scatterometer 1, in order to provide six measurements per pixel along the sub-satellite track SSt. The resulting ground-sweep velocity due to the antenna rotation alone is 122 km/s and 88 km/s, respectively, for the inner limit (circle $C_i$) of the antenna footprint 30. The sweep asymmetry on the left and right hand sides due to the satellite motion (i.e. 7 m/s) is therefore negligible (less than +10%).

A pulse compression technique has been used to provide 50 range-looks within 15 km (more specifically a compression ratio of 200 has been employed). For a spatial resolution of 15×15 km (i.e. a High-Resolution-mode or "HR"), a total of 685 looks (50×13.7) is summed to achieve a radiometric resolution of better than 0.3 dB and 0.37 dB, respectively for Option 1 and Option 2. The Wind-mode resolution of 50×50 km is achieved by a further summation of the looks, resulting in 0.09 dB and 0.11 dB radiometric resolutions, respectively.

The target spatial resolution has been achieved with a shorter antenna (3.6 m) for Option 1 (i.e. 725 km orbit height). As the antenna length is a critical design driver for such a mechanically rotated system (momentum problems), the lower orbit option (725-km) is preferable.

The measurement swath 40 is a result of the circular scan (low rotation speed of the antenna 10) combined with the motion VS of the spacecraft S. Referring again to FIG. 2, this shows a simulated foot-print over a flight distance of 675 km (i.e. a duration of 90 s). As one can see, each radar beam pass (which corresponds to a particular instantaneous footprint 30) is overlapped with respect to the previous one by about 70% along the sub-satellite track. This guarantees that at least three acquisitions at different incidence angle can be achieved in both the forward and backward directions. A given pixel point $p_i$ is imaged at a set of different azimuth view-angles which depends on its across track position.

Referring again to FIG. 3. As an example, the process is illustrated for three different pixel positions referenced p1, p2 and p3.

According to the illustrated example, pixel p1 is positioned at approximately mid distance between the sub-satellite track SSt and the (right-hand-side) swath-edge 400. In this case, up to ten acquisitions, p1a to p1j, can be performed during an overpass at various azimuth view-angles which are distributed evenly between approximately −45° to −135° with respect to the flight direction (measured in the direction of the scan).

In the case of a pixel positioned close to the sub-satellite track, namely pixel p2, the acquisitions will be concentrated both in the forward and backward directions, with a minimum of six acquisitions p2a to p2f (three acquisitions forward, p2a to p2c, and three acquisitions backward, p2d to p2f, respectively).

Finally, for a pixel located close to the (left-hand-side) swath-edge 401, namely pixel p3, the imaging takes place mostly in the across track directions (90° and −90° w.r.t. the flight direction) and the number of acquisitions will be reduced to four, p3a to p3d, for the illustrated example.

Figure 4A:
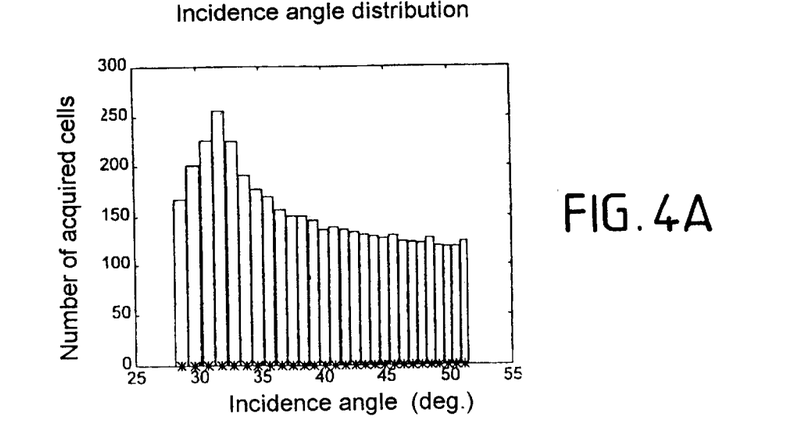
FIG. 4A is a curve representing the incidence angle distribution as a function of the across track distance, for a strip of 300–400 km.
Figure 4B:
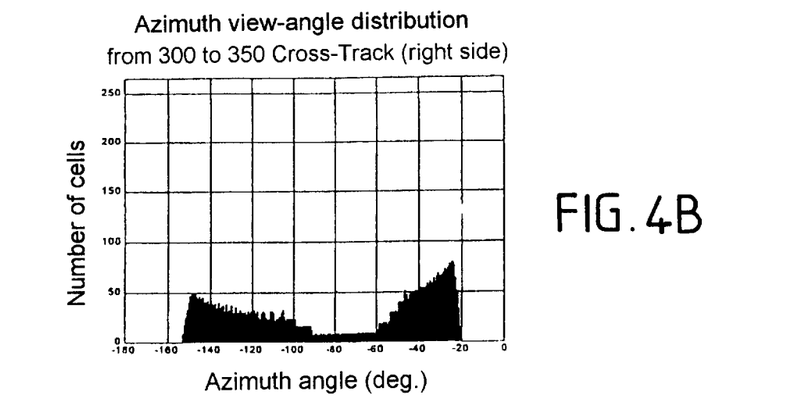
FIGS. 4B and 4C are curves representing the azimuth view-angle distribution as a function of the across track distance, for strips of 300–350 km and 350–400 km, respectively.
Figure 4C:
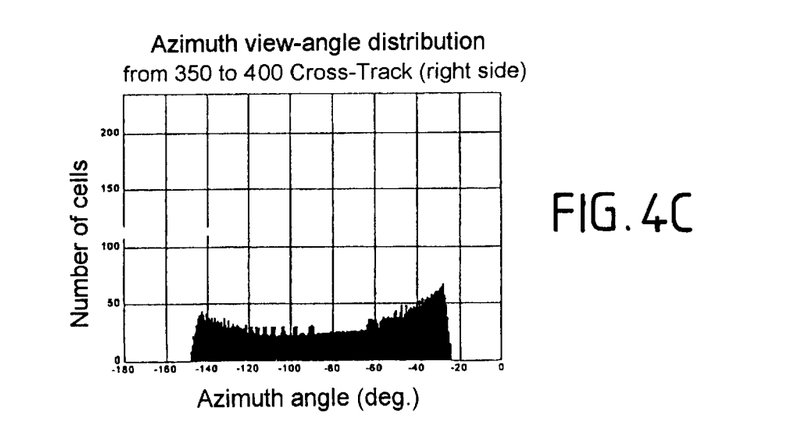

FIG. 4A to 4C illustrate examples of the incidence and azimuth view-angles distributions within a 100-km wide strip. More specifically, FIG. 4A is a curve illustrating the number of acquired cells versus the incidence angle, for a strip within 300–400 km cross-track positions, FIG. 4B is a curve illustrating the number of acquired cells versus the azimuth angle, for a sub-strip within 300–350 km cross-track positions (right side) and FIG. 4C is a curve illustrating the number of acquired cells versus the azimuth angle, for a sub-strip within 350–400 km cross-track positions (equally right side).

For such a strip, closer to the sub-satellite track SSt, the incidence angle distribution is relatively uniform, whereas the azimuth view-angle distribution has peaks around −26° and −146° and delimited within −20° and −153°.

Figure 5A:
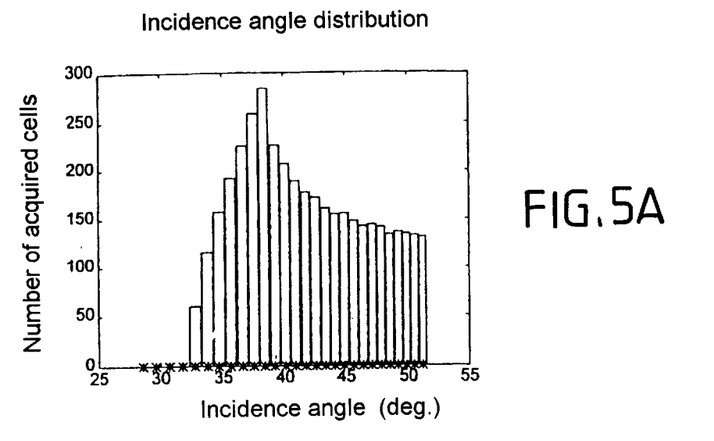
FIG. 5A is a curve representing the incidence angle distribution as a function of the across track distance, for a strip of 400–500 km.
Figure 5B:
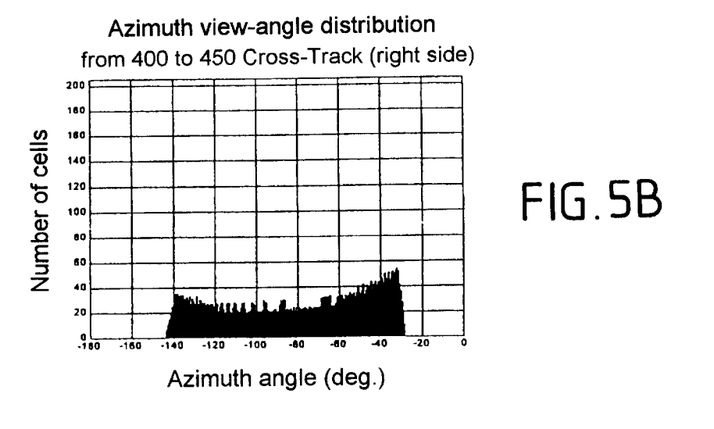
FIGS. 5B and 5C are curves representing the azimuth view-angle distribution as a function of the across track distance, for strips of 400–450 km and 450–500 km, respectively.
Figure 5C:
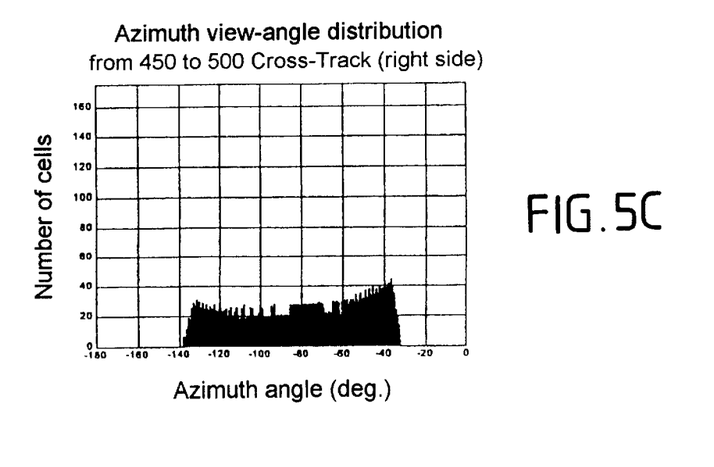

FIG. 5A is a curve illustrating the number of acquired cells versus the incidence angle, for a strip within 400–500 km cross-track positions, FIG. 5B is a curve illustrating the number of acquired cells versus the azimuth angle, for a sub-strip within 400–450 km cross-track positions (right side) and FIG. 5C is a curve illustrating the number of acquired cells versus the azimuth angle, for a sub-strip within 450–500 km cross-track positions (equally right side).

For such a strip, further away from to the sub-satellite track SSt, the incidence angle distribution becomes more peaky, whereas the azimuth view-angle distribution appears more homogeneous and delimited within −30° and −144°.

Figure 6:
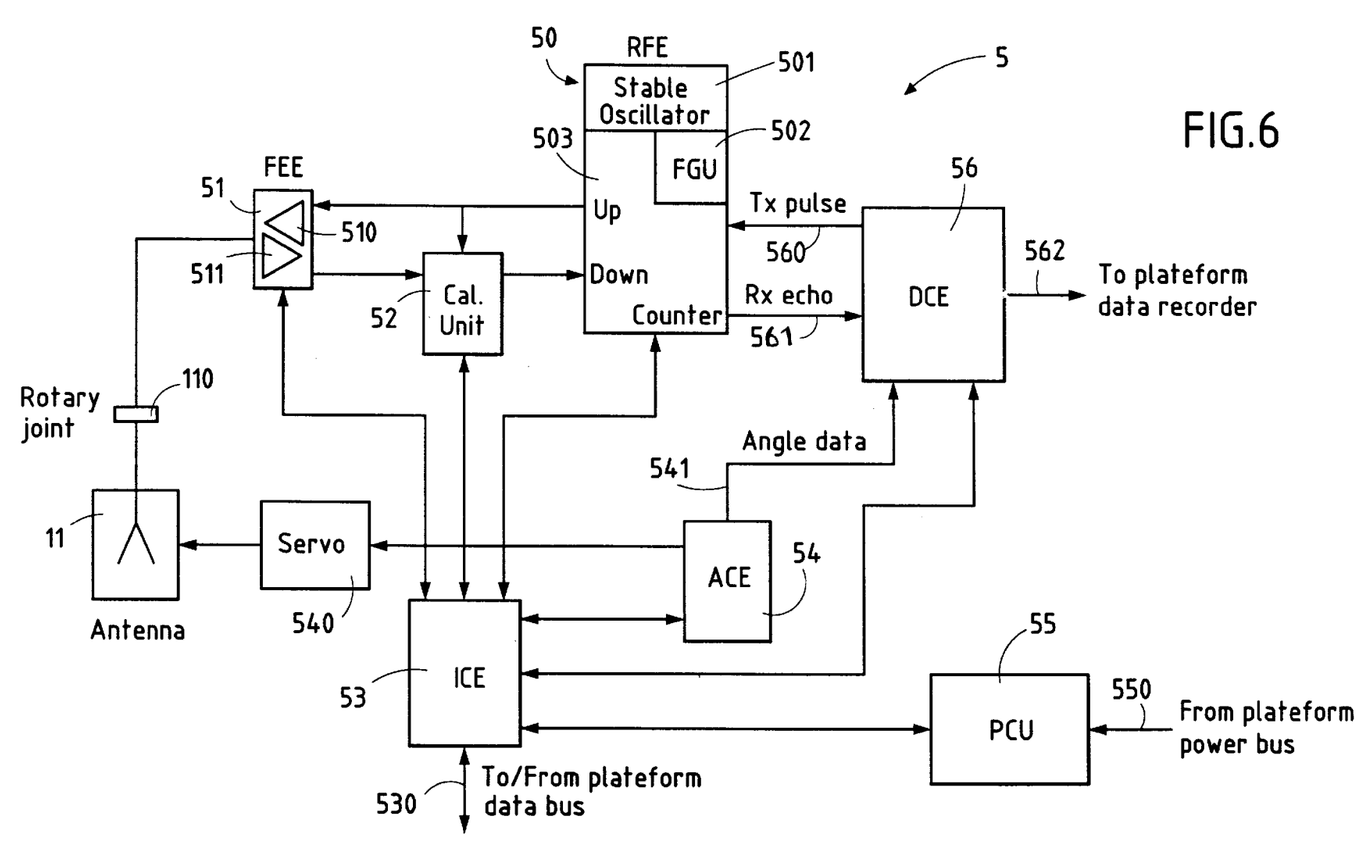
FIG. 6 represents a block diagram of a scatterometer according to the invention.

An example of an instrument and electronic circuits needed to generate said pulsed fan beam 3 and to receive and process echo signals will be now described with respect to FIG. 6. Said electronic circuits form the radar unit 10 (FIG. 1).

FIG. 6 shows a general block diagram of such an instrument 5 forming the scatterometer 1. The general architecture is rather simple and contains the following functional blocks:

Radio Frequency Electronics (RFE) 50 including all the transceiver functions: namely a stable oscillator 501 (which generates a reference frequency signal), a Frequency Generation Unit (FGU) 502, and an up-down counter 503;

Front-End Electronics (FEE) 51 comprising a transmitter high power amplifier 510 and a low noise receiver amplifier 511;

antenna 11, which is based on a passive array (e.g. slotted waveguides) and which is connected to the FEE 51 through a conventional rotary joint 110;

Calibration Unit 52 which has the function to allow injection of the received signals into suitable points of the receiver chain ;

Data Conditioning Equipment (DCE) 56 including a transmit chirp signal generator, a receiver A/D converter, a Doppler compensation unit, a pulse compression unit and a signal detector (including range and echo summations);

Interface Control Electronics (ICE) 53 interfacing a platform command and control bus 530 and managing the instrument operation ;

Antenna Control Electronics (ACE) 54 controlling an antenna servomechanism 540 and providing relevant angular data 541 to DCE 56; and Power Conditioning Unit (PCU) 55 providing all necessary regulated DC voltages to the instrument units.

RFE 50, and more precisely the up-down counter 503, receives the pulse to be transmitted from DCE 56, referenced as Tx pulse 560, and transmits the received signal to DCE 56, referenced as Rx echo 561.

The servomechanism 540 controls the rotation of the antenna 11, and more particularly its rotation speed.

The operating frequency of the scatterometer is in the C-band in order to ensure the measurement continuity with the ERS- ½ and ASCAT scatterometers. However, the concept presented is applicable to any other frequency bands, e.g. at Ku-band as preferred by NASA.

Furthermore, it is provided data recorder means (not shown), which receive output signals from DCE 56, via a bus 562, and store them, and a power supply unit (not shown), which produces all necessary voltage signals and transmits them via a so-called platform power bus 550. Finally, circuits 5 of the scatterometer are interfaced with general processing means (not shown) via ICE 53 and said platform data bus 530. Bus 530 transmits data and control information, to and from said general processing means, which comprise, for example, a receiver-emitter unit to communicate with an earth station (not shown), via an up-and-down RF transmission link.

Preferably, the antenna aperture is rectangular, for example with a height of approximately 0.4 m. In such a case, the total rotating mass is expected to be less than 20 kg.

Both travelling-wave tube (TWT) and solid-state high power amplifiers can be used. Generally, a high peak power is required. Accordingly, the TWT option is to be preferred.

It must be clear that overall, no critical technology or new development are required. The scatterometer according to the invention is compatible with usual technology employed in the field.

Thus the scatterometer according to the invention affords many advantageous features.

Particularly, as compared to conventional scatterometers, the following advantages can be mentioned:

1/ a large total swath (typically >1500 km) is achieved;

2/ a large number of independent measurements per pixel: up to ten azimuth views depending on the across-track position;

3/ a much slower rotation speed of the antenna as compared to the conically scanning pencil-beam concept (factor of at least 5.4 reduction as compared to SeaWinds scatterometer, for example);

4/ one single fanbeam antenna is used, and thus no switchings between different antennas are required;

5/ only simple conventional data processing is required: Doppler compensation, pulse compression and look summations.

Thus, the overall concept is simple and low-risk, as no critical technology is required.

It should be apparent however, that the invention is not solely limited to the embodiment examples specifically disclosed, especially with reference to FIGS. 1 to 5.

Finally, as already stated, it should be appreciated that, while being particularly adapted to determine wind speed and direction over the ocean, the invention is not confined to this particular application. Other physical parameters, such as land surfaces and ice characteristics can be measured.

TABLE I

| Parameters | Option 1 | Option 2 |
|---|---|---|
| Orbit/repeat cycle | 725 km/2 days | 1075 km/2 days |
| Total swath | 1500 km | 1600 km |
| Incidence angle | 28°–51° | 21°–42.5° |
| Antenna footprint (range direction) | 408.6 km | 450.5 km |
| Rotation period | 18 s (3.3 rpm) | 25 s (2.4 rpm) |
| Frequency | 5.3 GHz | 5.3 GHz |
| Polarization | VV (vertical transmit and vertical receive) | VV |
| Pulse bandwidth | 1.06 MHz | 1.39 MHz |
| Pulse compression factor | 200 | 200 |
| Pulse repetition frequency | 239 Hz | 179 Hz |
| Range summation | 50 samples (HR-mode) | 50 samples (HR-mode) |
| Echo summation | 13.7 echoes (HR-mode) | 13.4 echoes (HR-mode) |
| Spatial resolution | 15 × 15 km (HR-mode) 50 × 50 km (Wind-mode) | 15 × 15 km (HR-mode) 50 × 50 km (Wind-mode) |
| Radiometric resolution | <0.3 dB (15 × 15 km) <0.09 dB (50 × 50 km) | <0.37 dB (15 × 15 km) <0.11 dB (50 × 50 km) |
| Average RF-power | 145 W | 83 W |
| Antenna length | 3.6 m (unweighted) | 4.6 m (unweighted) |

What is claimed as new and desired to be secured by Letters Patent of the United States:

1. A scatterometer mounted on-board a spacecraft orbiting around the Earth at a determined speed for acquiring points over a strip of an Earth surface measuring determined physical parameters based upon the acquired point, comprising:

a single antenna continuously rotated at a determined rotation rate around an axis directed vertical to a sub-spacecraft track on said Earth surface; and a transmitter-receiver coupled to said antenna configured to generate radar signals to illuminate said Earth surface by a fan-beam covering a radially extending footprint that sweeps a circular disc pattern around said vertical axis when said antenna is rotating, to receive radar echo signals echoed from any discrete point of said Earth surface when illuminated by said radar signals, and to derive said physical parameters by processing said radar echo signals, wherein said determined rotation rate, relative to said determined spacecraft speed, provides overlapping successive sweeps each corresponding to a complete rotation of said fan-beam so that any point of said strip across said sub-spacecraft track is acquired during an overpass over said track at least three occasions corresponding to different azimuth angles.

2. A scatterometer according to claim 1, wherein said transmitter-receiver operate in pulsed mode, so that each point of a given echo profile received by said transmitter-receiver can be attributed to a unique pixel position within said foot-print.

3. A scatterometer according to claim 2, wherein said transmitter-receiver is further configured to resolve position of each of the acquired points within said strip by range-gating said radar echo signals.

4. A scatterometer according to claim 3, wherein a ground-speed component of the determined spacecraft speed along said sub-spacecraft track is approximately equal to 7 km/s and said antenna rotation rate is 3.3 rpm, so that each said foot-print is overlapped to a previous one by about 70% along said sub-spacecraft track.

5. A scatterometer according to claim 1, wherein said antenna comprises a passive array having slotted waveguides.

6. A scatterometer according to claim 5, wherein said antenna is rectangular.

7. A scatterometer according to claim 1, wherein said spacecraft is orbiting along a 725 km height circular orbit.

8. A scatterometer according to claim 1, wherein said print-foot is formed between an inner circle and an outer circle, corresponding to utmost incidence angles of said fanbeam between 28° and 51°.

9. A scatterometer according to claim 1, wherein said transmitter-receiver operates in C-band.

10. A scatterometer according to claim 1, wherein said physical parameters to be measured are wind speed and direction over oceans.

11. A scatterometer according to claim 1, wherein said physical parameters to be measured are land surfaces and ice characteristics.

12. A method of acquiring points over a strip of the Earth surface and measuring determined physical parameters of each of the acquired points, the method comprising:

continuously rotating a single antenna at a determined rotation rate around an axis directed vertical to a sub-spacecraft track on said Earth surface;

generating radar signals for illuminating said Earth surface by a fan-beam covering a radially extending footprint that sweeps a circular disc pattern around said vertical axis when said antenna is rotating; and receiving radar echo signals echoed from any discrete point of said Earth surface when illuminated by said radar signals and deriving said physical parameters by processing said radar echo signals, wherein said determined rotation rate, relative to said determined spacecraft speed, provides overlapping successive sweeps each corresponding to a complete rotation of said fan-beam so that any of said strip across said track is acquired during an overpass over said track at at least three occasions each corresponding to different azimuth angles.

13. A scatterometer system for acquiring points over a strip of an Earth surface and measuring determined physical parameters of each of the acquired points, comprising:

a single fan-beam antenna rotating at a slow rotation rate around an axis directed vertical to a sub-spacecraft track on said Earth surface; and a transmitter-receiver coupled to said antenna, the transmitter-receiver being configured to generate radar signals for illuminating said Earth surface by a fan-beam covering a radially extending footprint that sweeps a circular disc pattern around said vertical axis when said antenna is rotating, and to receive radar echo signals echoed from any discrete point of said earth surface when illuminated by said radar signals, the transmitter-receiver deriving said physical parameters by processing said radar echo signals, wherein said determined rotation rate, relative to said determined spacecraft speed, provides overlapping successive sweeps each corresponding to a complete rotation of said fan-beam so that any point of said strip across said track is acquired during an overpass over said track at at least three occasions corresponding to different azimuth angles.

14. The system according to claim 13, wherein the transmitter-receiver operates in pulsed-mode to attribute a unique pixel position within said footprint, the transmitter-receiver computing position of the acquired point within said strip by range-gating said radar echo signals.

15. A signal produced by a method of acquiring points over a strip of the Earth surface and measuring determined physical parameters of each of the acquired points, the method comprising:

continuously rotating a single antenna at a determined rotation rate around an axis directed vertical to a sub-spacecraft track on said Earth surface;

generating radar signals for illuminating said Earth surface by a fan-beam covering a radially extending footprint that sweeps a circular disc pattern around said vertical axis when said antenna is rotating; and receiving radar echo signals echoed from any discrete point of said Earth surface when illuminated by said radar signals and deriving said physical parameters by processing said radar echo signals, wherein said determined rotation rate, relative to said determined spacecraft speed, provides overlapping successive sweeps each corresponding to a complete rotation of said fan-beam so that any of said strip across said track is acquired during an overpass over said track at least three occasions each corresponding to different azimuth angles.

* * * * *